US009804899B2

(12) United States Patent
Buciuc

(10) Patent No.: US 9,804,899 B2
(45) Date of Patent: Oct. 31, 2017

(54) COMMUNICATIONS USING THE COMMON OBJECT REQUEST BROKER ARCHITECTURE (CORBA)

(75) Inventor: Sergiu Buciuc, Bucharest (RO)

(73) Assignee: Ixia, Calabasas, CA (US)

(*) Notice: Subject to any disclaimer, the term of this patent is extended or adjusted under 35 U.S.C. 154(b) by 1841 days.

(21) Appl. No.: 12/533,961

(22) Filed: Jul. 31, 2009

(65) Prior Publication Data
US 2011/0029678 A1 Feb. 3, 2011

(51) Int. Cl.
G06F 15/16 (2006.01)
G06F 9/54 (2006.01)
H04L 12/24 (2006.01)
H04L 29/08 (2006.01)
G06F 9/44 (2006.01)
G06F 9/46 (2006.01)
H04L 29/06 (2006.01)
H04L 29/12 (2006.01)

(52) U.S. Cl.
CPC ........ *G06F 9/541* (2013.01); *H04L 29/12509* (2013.01); *H04L 41/0233* (2013.01); *H04L 61/2567* (2013.01); *H04L 67/2804* (2013.01); *G06F 9/443* (2013.01); *G06F 9/4428* (2013.01); *G06F 9/465* (2013.01); *H04L 29/12141* (2013.01); *H04L 61/1558* (2013.01); *H04L 63/029* (2013.01)

(58) Field of Classification Search
CPC ....... H04L 63/029; G06F 9/4428; G06F 9/443
USPC .................................. 709/228, 203
See application file for complete search history.

(56) References Cited

U.S. PATENT DOCUMENTS

| 6,981,265 | B1 | 12/2005 | Rees et al. |
| 7,448,066 | B2 | 11/2008 | Birk et al. |
| 2002/0124113 | A1* | 9/2002 | Gargya et al. ............... 709/246 |
| 2002/0167941 | A1* | 11/2002 | Brueggemeier et al. ..... 370/352 |
| 2003/0008640 | A1* | 1/2003 | Lansio et al. ............... 455/414 |

(Continued)

OTHER PUBLICATIONS

Srisuresh, P. and Egevang, K., Traditional IP Network Address Translator (Traditional NAT), Request for Comments 3022, Network Working Group, Jan. 2001.

(Continued)

*Primary Examiner* — Philip Chea
*Assistant Examiner* — Mohammed Ahmed
(74) *Attorney, Agent, or Firm* — Jenkins, Wilson, Taylor & Hunt, P.A.

(57) ABSTRACT

Communications using the common object request broker architecture (CORBA) is disclosed. The communications are between a first computing device and a second computing device separated by a NAT device. The first computing device issues a request conforming to the CORBA protocol to obtain an IOR for an object from the second computing device. A first request interceptor on the first device adds a public IP address of the second computing device as user-defined data in the request. A second request interceptor on the second computing device extracts the IP address from the request and stores it. The second computing device builds the IOR for the object including embedding the public IP address of the second computing device in the IOR. The second computing device sends the IOR to the first computing device. The first computing device then establishes a successful connection to the public IP address received in the IOR.

6 Claims, 4 Drawing Sheets

(56) References Cited

U.S. PATENT DOCUMENTS

| | | | |
|---|---|---|---|
| 2003/0074485 A1* | 4/2003 | Zhdankin et al. | 709/316 |
| 2003/0221126 A1* | 11/2003 | Berman et al. | 713/201 |
| 2004/0059940 A1* | 3/2004 | Birk et al. | 713/201 |
| 2005/0022208 A1* | 1/2005 | Bolar et al. | 719/315 |
| 2006/0047831 A1* | 3/2006 | Piper | 709/229 |
| 2006/0167999 A1* | 7/2006 | Clark et al. | 709/204 |
| 2007/0118842 A1* | 5/2007 | Weida | G06F 9/465 |
| | | | 719/330 |
| 2008/0222697 A1 | 9/2008 | Birk et al. | |
| 2009/0049116 A1* | 2/2009 | Ferre et al. | 709/203 |

OTHER PUBLICATIONS

McHale, Ciaran, Corba Explained Simply, available at www.CiaranMcHale.com/download, Feb. 27, 2007.

Henning, Michi, The Rise and Fall of Corba, ACM Queue Magazine, vol. 4, Issue 5, Jun. 2006.

Chafee, Alex and Martin, Bruce, Introduction to Corba, MageLang Institute, Dec. 1999. Available at http://java.sun.com/developer/onlineTraining/corba/.

IXIA Communications, IxExplorer User's Guide, Revision 2.1.0, Nov. 1,1999, pp. 1-384.

IXIA Communications, Specifications for Load Modules—Multilayer Gigibit Ethernet for LM1000LX, LM1000SX, LM1000GBIC, LM1000T, Product Specification Sheet, 2 pages.

IXIA Communications, The Ixia 200 Traffic Generator and Analyzer, Product Description, 199701999, last accessed on Aug. 15, 2003, file://C:/DS/IXIA/Patents/081403/ix200.htm, pp. 1-2.

IXIA Communications, Ixia 200 Chassis, Product Description p. 1.

\* cited by examiner

COMMUNICATIONS USING THE COMMON OBJECT REQUEST BROKER ARCHITECTURE (CORBA)

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to communications of objects between two or more networks adhering to the Common Object Request Broker Architecture (CORBA).

Description of the Related Art

The Common Object Request Broker Architecture (CORBA) defines an architecture for distributed objects. The basic CORBA paradigm is that of a request for services of a distributed object. CORBA normalizes the method-call semantics between application objects that reside either in the same address space or remote address space. The CORBA standard defines a set of distributed services to support the integration and interoperation of distributed objects.

The CORBA standard specifies that there is an object request broker (ORB) through which an application interacts with objects. The ORB is a distributed service that implements requests to remote objects. The ORB locates the remote object on the network, communicates the request to the object, waits for the results, and, when available, communicates the results back to the requesting client. ORBs communicate with one another using the General Inter-ORB Protocol (GIOP).

Distributed objects are identified by object references. Clients issue a request on a CORBA object using an object reference. An object reference identifies the distributed object that will receive the request.

Object references can be passed around the distributed object system. However, it is difficult for CORBA applications to access objects that are distributed in another network or sub-network that is separated by a firewall or other security system. The internal addresses of objects cannot be used in the external network because they are not public addresses and cannot be routed. When an object request is made, the server publishes an address of the object that does not make sense in the external network. A client's attempt to connect to the provided object address will fail.

Networks such as the Internet carry a variety of data communicated using and through a variety of network devices including servers, routers, hubs, switches, and other devices. Before placing a network into use, the network, including the network devices, network media, network segments and network applications included therein, may be tested to ensure successful operation. Network devices and applications may be tested, for example, to ensure that they function as intended, comply with supported protocols, and can withstand anticipated traffic demands. Such testing may also be performed on already deployed network devices, network segments and network applications.

To assist with the construction, installation and maintenance of networks, network applications and network devices, networks may be augmented with network analyzing devices, network conformance systems, network monitoring devices, and network traffic generators, all which are referred to herein as network testing systems. The network testing systems may allow for analyzing the performance of networks, network applications and network devices by capturing, modifying, analyzing and/or sending network communications. The network testing systems may be used to evaluate how well a network device or network segment handles streaming media and voice communications. Specifically, a network testing system may allow a user to choose to simulate one or more entities defined by the Session Initiation Protocol (SIP), to simulate real-world VoIP traffic and/or to assess conformance with SIP standards.

To achieve the testing, evaluation and other tasks described above, the network testing system may use CORBA to access objects with a network and between networks or sub-networks.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
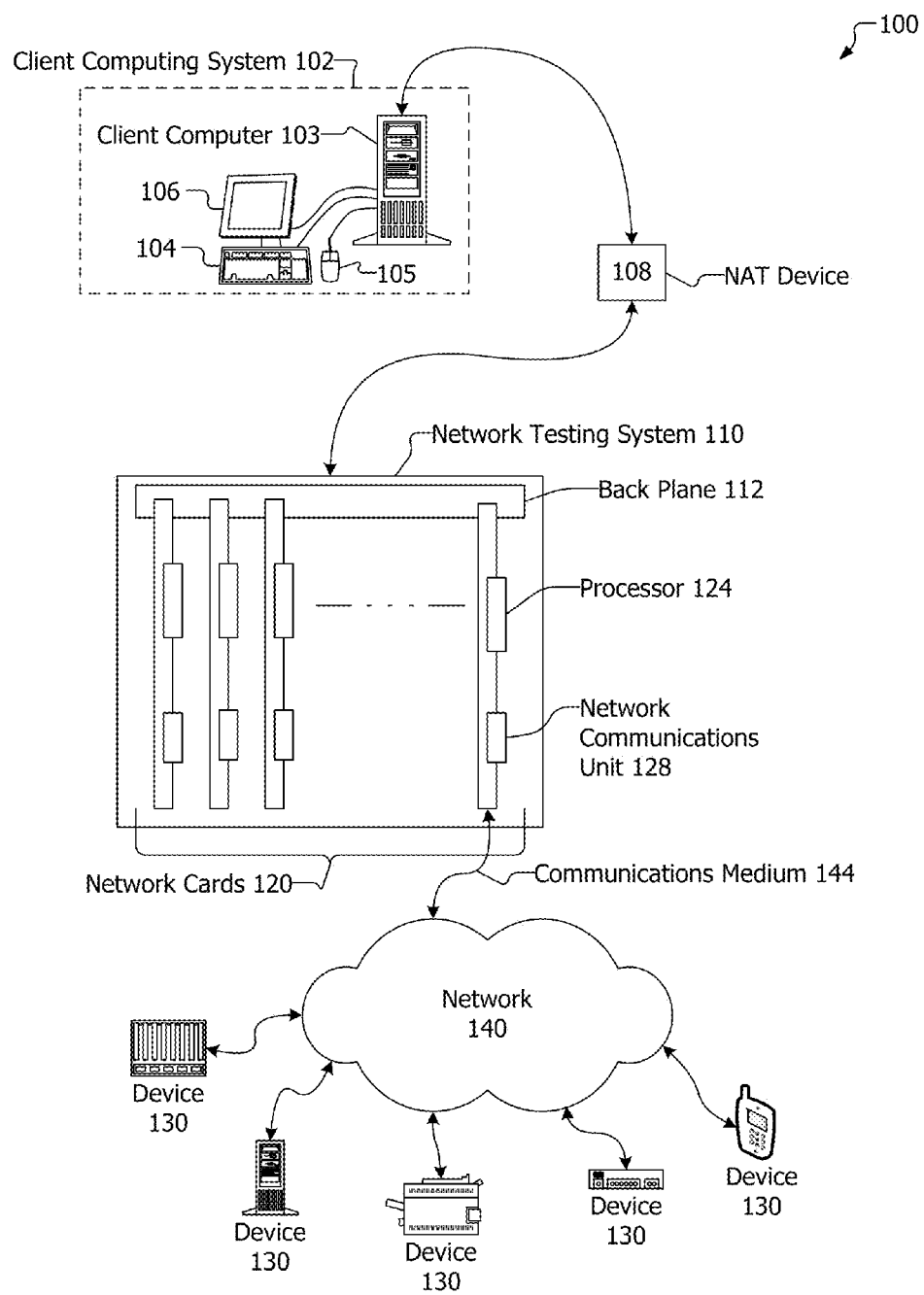
FIG. 1 is a block diagram of an environment in which communications using CORBA may be implemented.

FIG. 1 is a block diagram of an environment in which inter-network communications using CORBA may be implemented. The environment 100 shows a client computing system 102 that operates as a client in conjunction with network testing system 110 which may function as a server. Methods for receiving, processing and executing user authored and edited network tests may be implemented in the combination computing system 102 and network testing system 110. The client computing system 102 may use inter-network communications using CORBA to access the network testing system 110 that is located in a secure or private network. The client computing system 102 may use the techniques described herein to access the network testing system 110 located on a private or secure network through a router or other network device having security features, such as NAT device 108.

The environment 100 includes network testing system 110 coupled via a network card 120 to a network 140 over a communications medium 144. The network testing system 110 may communicate over network 140 with devices to execute various kinds of network tests.

The network testing system 110 may include or be one or more of a performance analyzer, a conformance validation system, a network analyzer, a packet blaster, a network management system, a combination of these, and/or others. The network testing system 110 may be used to evaluate or measure characteristics and performance of a network communication medium, a network communications device or system, including the throughput of network traffic, the number of dropped packets, jitter, packet delay, and many others. Such testing may be used to evaluate the Mean Opinion Score (MOS) or R-value score of a voice transmission, a video quality score or rating, a broadband quality score, or other similar media transmission score for a communication over a network or portion thereof and/or through a network communications device. The network testing system may be used to evaluate the performance of servers, network communications devices such as, for example, routers, gateways, firewalls, load balancers, and other network devices, as well as network applications and other software. The network testing system may be used to verify the functionality of network devices and/or conformance of SIP traffic with SIP standards or with vendor or specialized SIP implementations.

The network testing system 110 may be in the form of a chassis or card rack, as shown in FIG. 1, or may be an integrated unit. Alternatively, the network testing system may comprise a number of separate units such as two or more chassis cooperating to provide network analysis, network conformance testing, and other tasks. The chassis of the network testing system 110 may include one or more network cards 120 and a back plane 112. The network cards 120 may be coupled with back plane 112. One or more network cards 120 may be included in network testing system 110. The network cards 120 may be permanently installed in the network testing system 110, may be removable, or may be a combination thereof.

The network testing system 110 and/or one or more of the network cards 120 may include an operating system such as, for example, versions of Linux, Unix and Microsoft Windows.

Network card 120 is coupled with network 140 via a communications medium 144. Although one connection over communications medium 144 is shown, each of the network cards 120 may be connected with network 140 over a communications medium. In one embodiment, the network cards may have two or more connections each over a communications medium with the network 140 and/or with multiple networks. The communications medium may be, for example, wire lines such as an Ethernet cable, fibre optic cable, and coaxial cable, and may be wireless.

The network testing system 110 and the network cards 120 may support one or more well known higher level (OSI Layers 3-7) communications standards or protocols such as, for example, one or more versions of the User Datagram Protocol (UDP), Transmission Control Protocol (TCP), Internet Protocol (IP), Internet Control Message Protocol (ICMP), Internet Group Management Protocol (IGMP), Stream Control Transmission Protocol (SCTP), Session Initiation Protocol (SIP), Hypertext Transfer Protocol (HTTP), Address Resolution Protocol (ARP), Reverse Address Resolution Protocol (RARP), File Transfer Protocol (FTP), Real-time Transport Protocol (RTP), Real-time Transport Control Protocol (RTCP), Real-Time Streaming Protocol (RTSP), the Media Gateway Control Protocol (MEGACO), Session Description Protocol (SDP), Simple Mail Transfer Protocol (SMTP); may support one or more well known lower level communications standards or protocols (OSI Layers 1-2) such as, for example, the 10 and/or 40 Gigabit Ethernet standards, the Fibre Channel standards, one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as i.link® and Firewire®); may support proprietary protocols; and may support other protocols. Each network card 120 may support a single communications protocol, may support a number of related protocols, or may support a number or combination of unrelated protocols.

The term "network card" as used herein encompasses line cards, test cards, analysis cards, network line cards, load modules, interface cards, network interface cards, data interface cards, packet engine cards, service cards, smart cards, switch cards, relay access cards, CPU cards, port cards, and others. The network cards 120 may be referred to as blades, particularly when a processor is included on the network card.

The network cards 120 may include one or more processors 124 and one or more network communications units 128. In another embodiment, the network cards 120 may have no processors 124 and may include one or more network communications units 128. In the embodiment in which the network cards do not include a processor, processing may be performed by a processor on a motherboard of the network testing system 110, on another card, on the backplane or by a remote or external unit. When the network card 120 includes two or more network communications units 128, the network card 120 is in effect two or more network capable devices. That is, a network card 120 having n network communications units 128 may function as n network capable devices.

The network communications unit 128 may be implemented as one or more field programmable gate arrays (FPGA), application specific integrated circuits (ASIC), programmable logic devices (PLD), programmable logic arrays (PLA), other kinds of devices, and combinations of these. The network communications unit 128 may support one or more communications protocols. The network communications unit 128 may include a network interface through which the network card 120 may transmit and/or receive communications over the network 140.

The network card 120 may include and/or have access to local and/or remote memory, storage media and storage devices. Instructions to be executed by the processor may be stored on and executed from a local or remote machine readable medium or storage device. A machine readable medium includes magnetic media (e.g., hard disks, tape, floppy disks), optical media (e.g., CD, DVD), flash memory products (e.g., memory stick, compact flash and others), and volatile and non-volatile silicon memory products (e.g., random access memory (RAM), programmable read-only memory (PROM), electronically erasable programmable read-only memory (EEPROM), and others). A storage device is a device that allows for the reading from and/or writing to a machine readable medium. Storage devices include hard disk drives, solid-state drives (SSDs), DVD drives, and flash memory devices.

The processor 124, network communications unit 128, and memory may be included in one or more FPGAs, PLAs, PLDs on the network card 120. Additional and fewer units, hardware and firmware may be included in the network card 120.

The back plane 112 may serve as a bus or communications medium for the network cards 120. The back plane 112 may also provide power to the network cards 120.

The network testing system 110 may have a computing system 102 coupled thereto. Although the computing system 102 may be local to or remote from the network testing system 110, as described herein, the computing system 102 is separated from the network testing system 110 by a security device such as NAT device 108. The network testing system 110 may have coupled therewith a display 106 and user input devices such as a keyboard 104 and a mouse 105, as well as other user input devices including, for example, pens and trackballs. The user input devices may be coupled to a network card, other card, motherboard, or backplane included in the chassis.

In another embodiment, the network testing system 110 may be implemented in a computer such as a personal computer, server, or workstation, as well as the chassis shown. The network testing system 110 may be used alone or in conjunction with one or more other network testing systems 110. The network testing system 110 may be located physically adjacent to and/or remote to the network capable devices 130 in the network 140. The network testing system 110 may be used to test and evaluate the network 140 and/or portions thereof, network capable devices 130, applications running on network capable devices 130, and/or services provided by network 140 and/or network capable devices 130 and/or network applications. The network testing system 110, the network cards 120, and the network communications units 128 may all be network capable devices.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, and may be a combination of these. The network 140 may be comprised of numerous nodes providing numerous physical and logical paths for data units to travel. Each node may be a network capable device as described below. A node may be a computing device, a data communications device, a network capable device, a network card, or other devices as defined and described herein.

Communications on the network 140 may take various forms, including frames, cells, datagrams, packets, messages, higher level logical groupings, or other units of information, all of which are referred to herein as data units. Those data units that are communicated over a network are referred to herein as network traffic. The network traffic may include data units that represent electronic mail messages, streaming media such as music (audio) and video, telephone (voice) conversations, web pages, graphics, documents, and others.

The network capable devices 130 may be devices capable of communicating over the network 140 and/or listening to, injecting, delaying, dropping, relaying, processing, and/or modifying network traffic on network 140. The network capable devices 130 may be computing devices such as computer workstations, personal computers, servers, portable computers, set-top boxes, video game systems, personal video recorders, telephones, personal digital assistants (PDAs), computing tablets, and the like; peripheral devices such as printers, scanners, facsimile machines and the like; network capable storage devices including disk drives such as network attached storage (NAS) and SAN devices; testing equipment such as network analyzing devices, network conformance systems, emulation systems, network monitoring devices, and network traffic generators; components such as processors, network cards and network communications units; and networking devices such as routers, relays, firewalls, hubs, switches, bridges, traffic accelerators, and multiplexers. In addition, the network capable devices 130 may include home appliances such as refrigerators, washing machines, and the like as well as residential or commercial heating, ventilation, and air conditioning (HVAC) systems, alarm systems, and other devices or systems capable of communicating over a network. One or more of the network capable devices 130 may be devices to be tested and may be referred to as devices under test.

The network testing system 110 may send communications over the network 140 to a or through a network capable device 130. The destination of communications sent by the network testing system 110 may be a device under test such as a network capable device 130, may be the network testing system 110, and may be a second network testing system (not shown). The network testing system 110 may listen to and capture communications on the network 140.

The client computing system 102 may execute network testing software that also includes a client application. When the network testing system 110 is located behind a NAT device such as a router with firewall or other security features, including those conforming to the Network Address Translation (NAT) protocol specified in Request for Comment (RFC) 3022, the client computing system 102 communicates with the network testing system 110 using the CORBA protocol as set forth herein. The NAT device 108 may be a router, firewall, switch, gateway, Session Border Controller (SBC), Application Layer Gateway (ALG), or other or other network device having security features that conform to the NAT protocol. The client computing system 102 may communicate with the network testing system 110 through NAT device 108 over a network, which may be like network 140, or may be network 140. Similarly, the client computing system 102 may communicate with the network testing system 110 through NAT device 108 over network 140 such that NAT device 108 may be accessible to the client computing system 102, and the NAT device 108 may be directly coupled with network testing system 110 or the NAT device 108 may be a gateway to a private network that connects NAT device 108 with network testing system 110.

The methods described herein may be implemented on one or more FPGAs and/or other hardware devices, such as, for example, digital logic devices. The methods described herein may be implemented as software, namely network testing software, running on a network testing system and on a client computing system and executed by a processor, such as a processor on a network card or a processor in a blade or other card with a processor in the network testing system and such as a processor in a computing device. The network testing software may be stored on a volatile or nonvolatile memory device or storage medium included in or on and/or coupled with a computing device, a network testing system, a network card, and/or other card. The methods may be implemented in part on one or more network cards 120 in a single network testing system or may be implemented in part on each of one or more network cards 120 on each of two network testing systems.

Figure 2:
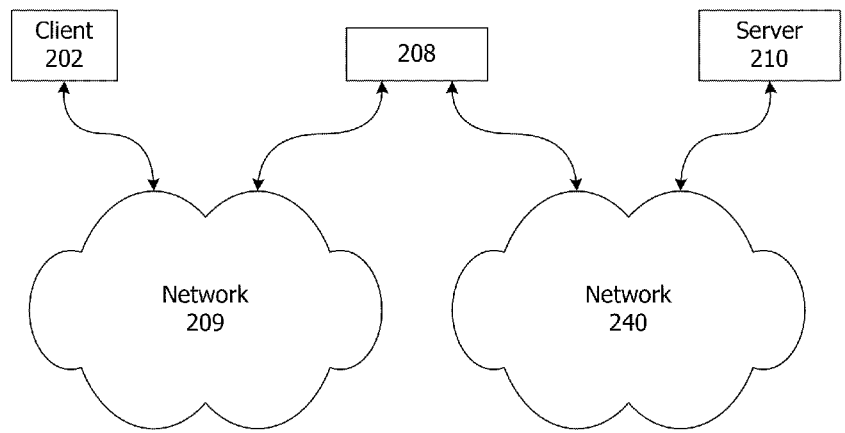
FIG. 2 is a block diagram of a network configuration in which inter-network communications using CORBA may be implemented.

FIG. 2 is a block diagram of a network configuration in which inter-network communications using CORBA may be implemented. A computing system may execute network testing software that includes CORBA client software such that the computing system operates as client 202. A network testing system may execute network testing software that includes a CORBA server such that the network testing system operates as a server 210. A firewall, gateway, router or other device 208 conforming to the NAT protocol may separate a first network 209 to which the client computing system 202 is connected from a second network 240 to which the network testing system operating as server 210 is connected. For the client computing system 202 to communicate with the network testing system server 210, the client computing system 202 must communicate over NAT device 208 to access the network testing system server 210 over networks 209 and 240 as set forth herein. The client computing system 202, NAT device 208 and network testing system 210 of FIG. 2 may be the client computing system 102, NAT device 108 and network testing system 110 of FIG. 1.

Figure 3:
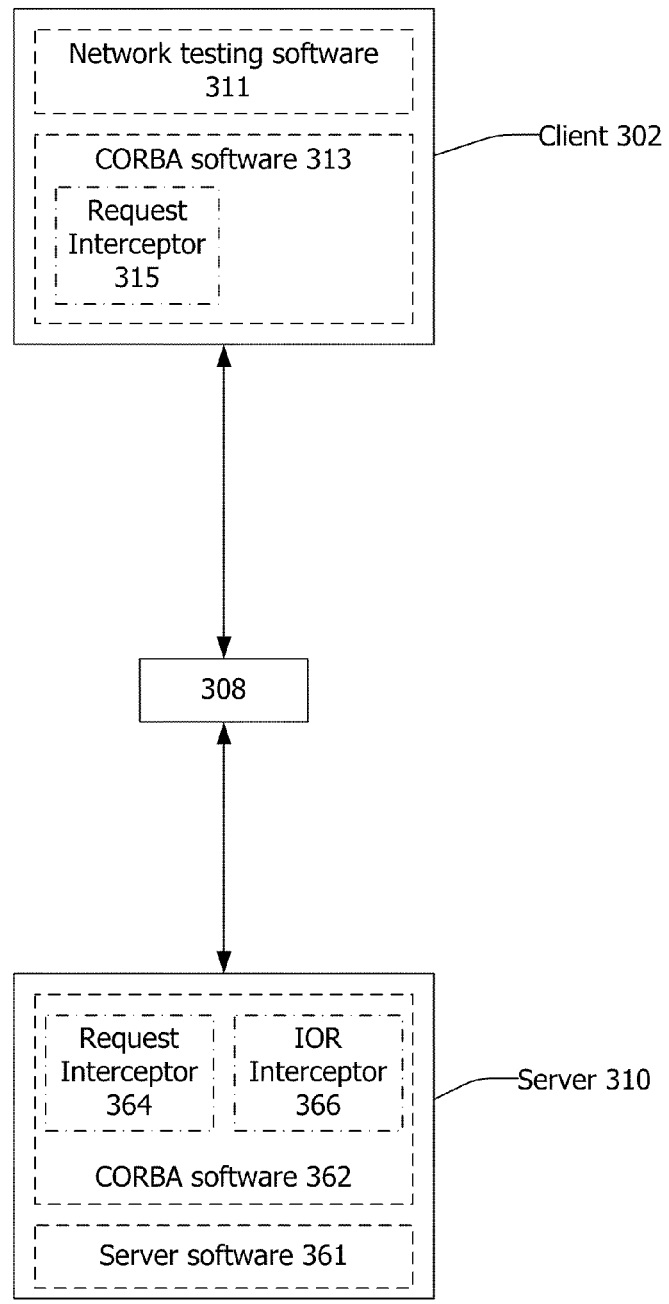
FIG. 3 is a block diagram showing am embodiment of software components involved in communications using CORBA.

FIG. 3 is a block diagram showing an embodiment of software components involved in communications using CORBA. FIG. 3 shows some of the software components that may be used to implement the inter-network communications using CORBA described herein. The client 302, the NAT device 308 and the server 310 of FIG. 3 may be the network testing system 110, the client computing system 102, and the NAT device 108 of FIG. 1. In other embodiments, the client 302 and server 310 may be computing devices separated by a NAT device 308.

As shown in FIG. 3, the client 302 may include network testing software 311 and CORBA software 313, and the CORBA software 313 includes the client request interceptor software 315. Although shown separately, the network testing software 311 may include the CORBA software 313 and the client request interceptor software 315. The server 310 may include server software 361 and CORBA software 362, and the CORBA software 362 includes server request interceptor software 364 and Interoperable Object Reference (IOR) interceptor software 366. Although shown separately, the server software 361 may include the CORBA software 362, the server request interceptor software 364 and the IOR interceptor software 366.

The various interceptor software may be a software interface that is called at particular stages during the processing of object requests. Interceptors generally inspect and/or manipulate object requests. Request interceptors may be used to add user-defined information to a CORBA request and to read user-defined information included in a CORBA request. IOR interceptors may be used to insert user-defined information into an IOR. The client request interceptor software 315, server request interceptor software 364 and IOR interceptor software 366 may be "portable interceptors" as described in the CORBA 2.4.2 specification. The client request interceptor software 315 and server request interceptor software 364 are called during request mediation. The IOR interceptor software 366 is called when new object references are created so that service-specific data can be added to the newly-created IOR in the form of tagged components.

Description of Processes

The actions taken to communicate between networks using CORBA may be performed as a method in software that executes on a computing system and a network testing system, such as, for example, the devices and configurations shown in FIGS. 1, 2 and 3. The method is achieved between a client and a server with a network capable device running NAT software or otherwise implementing the NAT protocol between the client and server. As shown in FIGS. 1, 2 and 3, the client may be implemented on a computing device such as a personal computer or workstation, and the server software may be implemented on a_network testing system.

In other embodiments, the client and server may be computing devices separated by a NAT enabled device.

The actions performed to communicate between networks using CORBA may be understood by referring again to FIG. 3. A client application, namely the client network testing software 311, registers a request interceptor 315 using the CORBA software 313. The client request interceptor 315 is called by the client ORB when the client makes an object request. The client request interceptor 315 creates a new ServiceContext in which it embeds the external IP address of the server. The ServiceContext is a field in the request or reply header of General Inter-ORB Protocol (GIOP) messages. The message may be sent using GIOP. The ServiceContext contains data that is added to each request by the client ORB at runtime. The main use of the ServiceContext is to propagate information required by some ORB services. The ServiceContext may propagate a transaction identifier if the request is made as part of a transaction, or a security context for ORBs that implement the Object Management Group (OMG) Security Service. In the embodiment described herein, the ServiceContext contains IP information and/or may contain event TCP port information. The ServiceContext contains TCP port information for use with a Port Address Translation (PAT) implementation in which TCP PAT translates TCP port numbers and user IP addresses on a private network and maps them to a single assigned address. The new ServiceContext is placed in the ServiceContext list and sent with a message to the server 360.

Server software 361 on the server 360 registers a server request interceptor 364 using the CORBA software 362. The server request interceptor 364 is called by the server ORB when the server receives a request. The server request interceptor 364 reads its IP address from the ServiceContext sent by the client.

The server 360 registers an IOR interceptor 366 which is called by the server ORB when the server publishes an IOR to the client 310. The IOR interceptor 366 inserts in the IOR the IP address received from the client 310.

Figure 4:
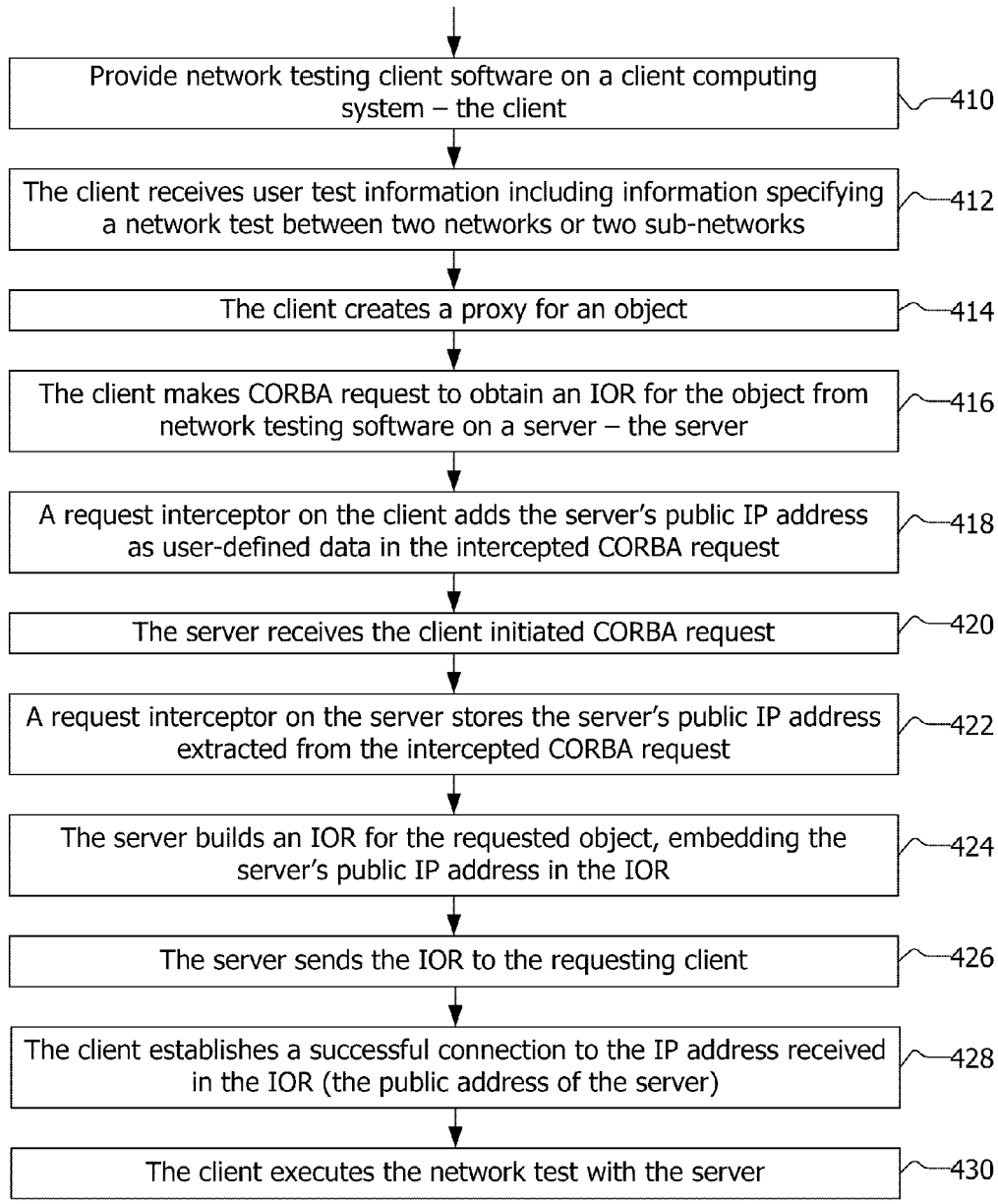
FIG. 4 is a flow chart of actions taken for two devices to communicate using CORBA.

FIG. 4 is a flow chart of actions taken to communicate between networks using CORBA. Network testing software, that is, the client, on a client computing system or other computing device is provided, as shown in block 410. The client receives user test information including information specifying a network test between two networks or two sub-networks, as shown in block 412. In another embodiment, computing devices that wish to obtain the IP address of another computing device behind a NAT firewall or in a NAT protected network may use this CORBA-based method. In these other embodiments, block 412 is replaced with communications between two computing devices on either side of a NAT device are specified.

The client creates a proxy for an object, as shown in block 414. As used and described herein, the proxy is an interface to an object in the server address space. Calling methods on the proxy causes the client ORB to convert the requests into GIOP requests which are sent to the ORB on the server side. The server side ORB reads and interprets the GIOP messages and invokes the requested methods on the server object. If the methods have return values or out parameters, these are returned to the client ORB in the GIOP reply. In this way, the client uses the proxy like it would use the actual object. The proxy allows the client to access the object at a remote location, namely, on the server, as if it were a local object.

The client makes a CORBA request to obtain an IOR for the object from network testing system server software on a network testing system operating as a server, as shown in block 416. In another embodiment that involves communications between two computing devices on either side of a NAT device, block 416 is replaced with the client making a CORBA request to obtain an IOR for the object from a server.

A request interceptor on the client adds the server's public IP address as user-defined data in the intercepted CORBA request, as shown in block 418. The server receives the client initiated CORBA request, as shown in block 420. A request interceptor on the server extracts the IP address from the intercepted CORBA request and stores it as the server's public IP address, as shown in block 422. The server builds an IOR for the requested object, embedding the server's public IP address in the IOR, as shown in block 424. The server sends the IOR to the requesting client, as shown in block 426. The client establishes a successful connection to the IP address received in the IOR which is the public address of the server, as shown in block 428. The client executes the user specified network test with the server through the NAT device, such as a router, gateway or firewall, as shown in block 430. In another embodiment that involves communications between two computing devices on either side of a NAT device, block 430 is replaced with the two computing devices, namely the client and server, communicating with each other.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A method for implementing a network test, the method comprising:

providing a client computing device executing common object request broker architecture (CORBA) client software and a network test system device executing CORBA server software, wherein the network test system device is configured to monitor and capture communications on a network when executing tests provided by the client computing device;

deploying the client computing device and the network test system device such that the client computing device and the network test system device are separated from each other via a network address translation (NAT) device; using the client computing device to initiate execution of a network test on the network test system device by:

receiving, by the client computing device, information specifying the network test and specifying an object available at the network test system device;

creating, by the client computing device, a proxy for the object, wherein the proxy is an interface to the object at the network test system device;

issuing, by the client computing device, a request conforming to the CORBA protocol to obtain an interoperable object reference (IOR) for the object from the network test system device;

adding, by a first request interceptor on the client computing device, a public IP address of the network test system device as user-defined data in the request;

transmitting the request including the public IP address of the network test system device from the client to the network test system device;

receiving, by the network test system device, the request;

extracting, by a second request interceptor on the network test system device, the public IP address from the request and storing the public IP address;

building, by the network test system device, the IOR for the object including embedding the public IP address of the network test system device in the IOR;

sending, by the network test system device, the IOR to the client computing device;

receiving, by the client computing device, the IOR from the network test system device;

establishing, by the client computing device, a successful connection to the public IP address received in the IOR;

initiating, by the client device, execution of the network test with the object and involving the network test system device, including:

accessing, by the client computing device, the object at the network test system device via the proxy; and communicating, by the client computing device, with the network test system device through the NAT device via the proxy.

2. The method of claim 1 wherein the NAT device is one selected from the group including a router, a gateway, and a firewall.

3. The method of claim 1 wherein the client computing device is a personal computer or workstation.

4. A client computing device for implementing a network test, the client computing device comprising:

a user input device;

a display device;

a processor;

a memory;

wherein the processor and the memory comprise circuits and software for:
executing common object request broker architecture (CORBA) client software for communicating, through a network address translation (NAT) device, with a network test system device executing CORBA server software, wherein the network test system device is configured to monitor and capture communications on a network when executing tests provided by the client computing device;
initiating execution of a network test on the network test system device by:
receiving, via the user interface, specification of an object available at the network test system device;
creating a proxy for the object, wherein the proxy is an interface to the object at the network test system device;
issuing a request conforming to the CORBA protocol to obtain an interoperable object reference (IOR) for the object from the network test system device;
creating a request interceptor;
adding via the request interceptor a public IP address of the network test system device as user-defined data in the request;
transmitting the request including the public IP address of the network test system device from the client to the network test system device;
receiving the IOR from the network test system device, the IOR including the public IP address from the request;
establishing a successful connection to the public IP address received in the IOR; accessing the object at the network test system device;
receiving a network test specifying the object available at the network test system device;
sending the network test specifying the object to the network test system device through the NAT device for execution.

5. A non-transitory machine readable storage medium having instructions stored thereon which when executed by a processor cause a client computing device to perform actions comprising:
executing common object request broker architecture (CORBA) client software for communicating, through a network address translation (NAT) device, with a network test system device executing CORBA server software, wherein the network test system device is configured to monitor and capture communications on a network when executing tests provided by the client computing device;
initiating execution of a network test on the network test system device by:
specifying, by the client computing device, a remote object available at the network test system device:
creating, by the client computing device, a proxy for the object, wherein the proxy is a local interface to the remote object at the network test system device:
issuing, by the client computing device, a request conforming to a CORBA protocol to obtain an interoperable object reference (IOR) for the remote object from the network test system device:
adding, by a first request interceptor on the client computing device, a public IP address of the network test system device as user-defined data in the request:
transmitting, by the client computing device, the request including the public IP address of the network test system to the network test system device;
receiving, by the client computing device, the IOR from the network test system device, the IOR including the public IP address of the network test system device:
establishing, by the client computing device, a successful connection to the public IP address received in the IOR:
accessing by the client computing device, the remote object at the network test system device as if the remote object were a local object:
receiving, by the client computing device, a network test specifying the remote object at the network test system device: and
executing, by the client computing device, the network test including accessing the remote object and communicating with the network test system device through the NAT device.

6. The non-transitory machine readable storage medium of claim 5 wherein the client computing device comprises a personal computer or workstation.

* * * * *